United States Patent [19]
Fury

[11] 3,980,051
[45] Sept. 14, 1976

[54] RANGE TRIGGERED ANIMAL TRAINING SYSTEM
[75] Inventor: Charles M. Fury, Chicago, Ill.
[73] Assignee: Lawrence Peska Associates, Inc., New York, N.Y. ; a part interest
[22] Filed: May 16, 1975
[21] Appl. No.: 578,215

[52] U.S. Cl. ................................. 119/29; 340/1 R; 340/3 E
[51] Int. Cl.² ...................................... A01K 15/00
[58] Field of Search ........... 340/3 E, 152 T; 119/29; 343/225

[56] References Cited
UNITED STATES PATENTS

| | | | |
|---|---|---|---|
| 3,336,530 | 8/1967 | Sloan et al. .................. | 119/29 UX |
| 3,608,524 | 9/1971 | Waltz ............................. | 119/29 |
| 3,753,421 | 8/1973 | Peck ............................... | 119/29 |
| 3,823,691 | 7/1974 | Morgan .......................... | 119/29 |

*Primary Examiner*—Richard A. Farley
*Attorney, Agent, or Firm*—Jack D. Slobod

[57] ABSTRACT

A system for teaching a pet, such as a dog, not to wander beyond a predetermined distance includes a dog whistle triggered by an ultrasonic ranging system. An ultrasonic pulse transmitter worn by the master produces a repetitive signal at a first superaudible frequency which is repeated by an ultrasonic transponder worn by the pet. This second frequency is received at the master. The pulse width is chosen to correspond to the time for sound to travel the predetermined distance in a round trip between the master and pet. If no pulse is received at the trailing edge of the transmitter pulse, a third frequency, in the nature of a dog whistle is transmitted from the master to signal the pet to return and to provide a homing signal therefor.

3 Claims, 3 Drawing Figures

U.S. Patent  Sept. 14, 1976  3,980,051
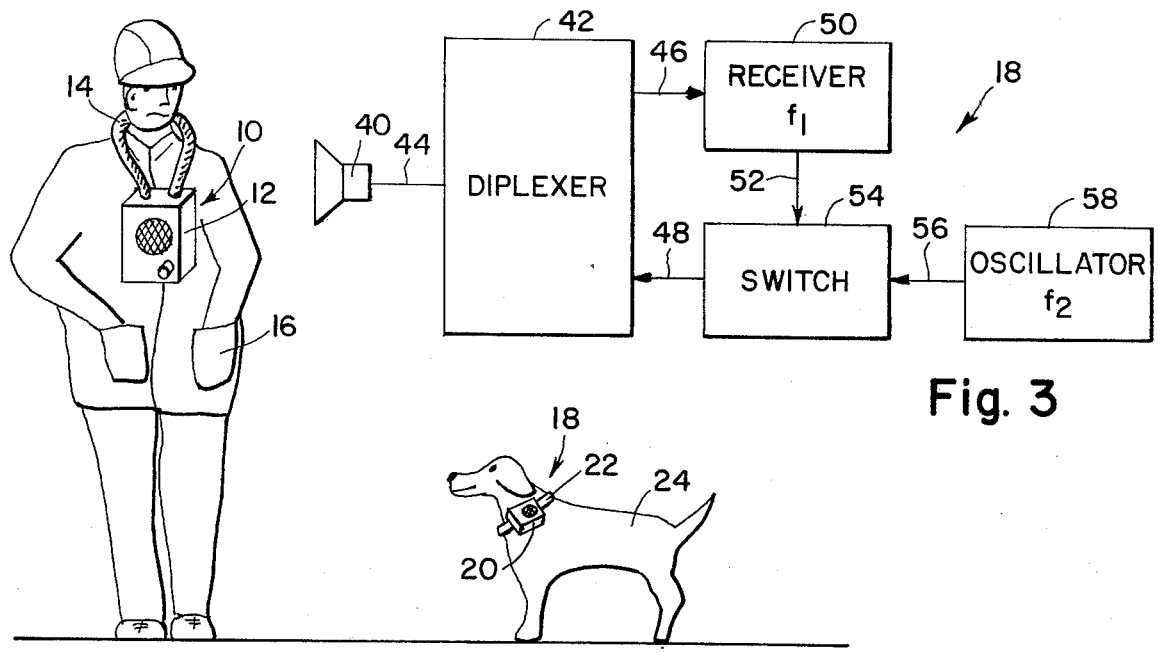
Fig. 3
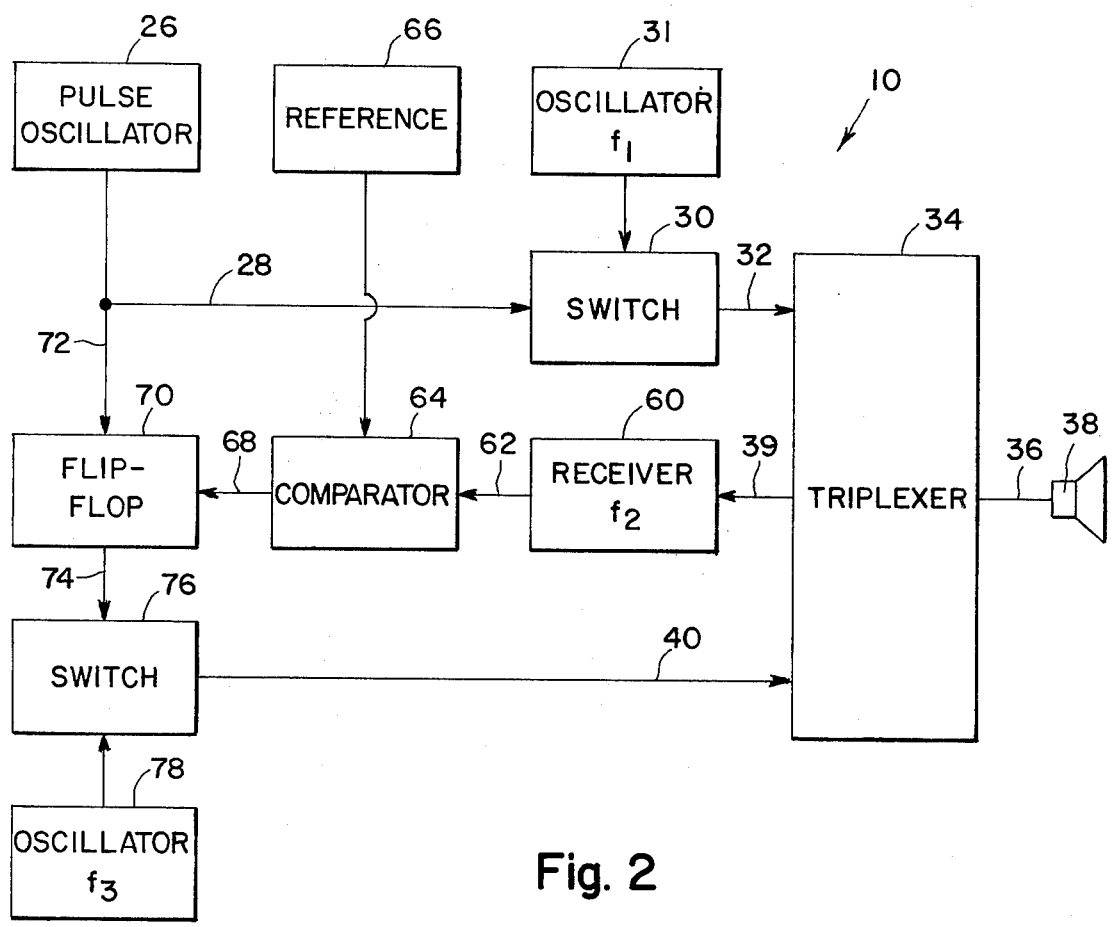
Fig. 1
Fig. 2

RANGE TRIGGERED ANIMAL TRAINING SYSTEM

FIELD OF THE INVENTION

The present invention relates generally to remote control devices for training animals. In its particular aspects the present invention relates to a ranging system configured to signal the animal to return to a particular location when it wanders beyond a predetermined distance therefrom.

BACKGROUND OF THE INVENTION

One of the most difficult things to teach a pet animal such as a dog is to stay within a predetermined distance from its master or from a particular location such as the home. To accomplish this lesson, persistence is required so that not one instance of the dog exceeding the predetermined distance goes unchecked.

While in the prior art, animals have worn remotely operated shocking devices for training purpose, to my knowledge, no signalling or training system for an animal has heretofore included a ranging system for automatically triggering the signalling means.

OBJECTS OF THE INVENTION

It is an object of the present invention to provide a system for automatically signalling an animal to return whenever the animal strays beyond a predetermined distance from his trainer or other particular location.

It is a further object of the present invention to provide a range triggered system for signalling an animal which includes as few parts as possible to be worn by the animal and which is sensitive to relatively short distances such as 20 feet.

SUMMARY OF THE INVENTION

Briefly, the aforementioned and other objects of the present invention are satisfied by providing a dog whistle signal triggered by an ultrasonic ranging system. The ranging system is chosen to be ultrasonic, because of the relatively slow speed of sound which permits measurements of round trip time delays of approximately forty milliseconds to indicate a distance of twenty feet. A pulse transmitter and receiver for superaudible sound frequencies as well as a signal generator for a dog whistle frequency are provided in a first housing adapted either to be worn by the master or placed at a predetermined location.

A second housing, adapted to be worn by the pet includes a transponder for receiving a superaudible pulse sound at a first frequency from the transmitter and repeating the pulse at a second superaudible sound frequency to be sensed by the receiver in the first housing.

The pulse width is chosen equal to approximately forty milliseconds. A flip-flop having an output for controlling the dog whistle is clocked at the trailing edge of the transmitter pulse. The receiver output is applied to the flip-flop. If no receiver output is present when the flip-flop is clocked, indicative of the animal exceeding the predetermined distance of about 20 feet, the flip-flop is set to activate the dog whistle signalling the animal to return.

Other objects, features and advantages of the present invention will become apparent upon perusal of the following detailed description of the preferred embodiment thereof when taken in conjunction with the appended drawing wherein:

FIG. 1 is an elevational pictorial presentation of the animal training system of the present invention in use including a portion on a trainer and a portion on a dog;

FIG. 2 is a block diagram for the portion on the trainer in FIG. 1; and

FIG. 3 is a block diagram for the portion on the dog in FIG. 1.

DETAILED DESCRIPTION

Referring first to FIG. 1 of the drawing, the animal training system of the present invention comprises a first portion 10 within a rectangular housing 12 having a strap 14 to be worn about the neck of a trainer 16. A second portion 18 is located in a rectangular housing 20 adapted to be carried on a collar 22 worn by an animal 24, such as a dog, to be trained. The housing 12 may be carried on trainer 16, as illustrated, or alternatively may be positioned at a particular location from which the relative position of pet 24 is to be monitored.

Now with reference also to FIGS. 2 and 3, it will be understood as the discussion proceeds that the portion 10 and portion 18 comprise a combined ultrasonic ranging system and dog whistle.

In portion 10, a pulse oscillator 26 generating pulses of approximately 40 millisecond pulse width, repeated approximately once each second and a half, drives the control input 28 of an electronic switch or modulator 30. Switch 30 also receives an input from an oscillator 31 having a frequency of oscillation at a first superaudible frequency $f_1$. During the duration of the pulse on line 28, a pulse burst of frequency $f_1$ is passed to the output 32 of switch 30. Output 32 is connected to a triplexer 34 which has plural filter means (not shown) for directing signal frequencies $f_1, f_2,$ and $f_3$ which may be present on a line 36, connected to the triplexer, respectively to different lines 32, 39 and 40 also connected to triplexer 34. Thus line 32 is coupled to line 36 and uncoupled from lines 39 and 40 by the frequency separating action of triplexer 34. Line 36 feeds an acoustic transducer 38, preferably being a piezoelectric crystal for converting the electric signal on line 36 to an acoustic transmitted signal and for converting a received acoustic signal to an electric signal.

The acoustic signal emanating from transducer 38 travels the distance between the trainer 16 and dog 24 and is received in a similar acoustic transducer 40 in system portion 18. The transducer 40 is connected to a diplexer 42 via line 44. As will be soon apparent, possibly two operative frequencies $f_1$ and $f_2$ may appear on line 44. These frequencies are separated respectively onto lines 46 and 48 connected to diplexer 42. Line 46 feeds a receiver 50 for frequency $f_1$. The output of receiver 50 on line 52 comprises the pulse envelope of the transmitted signal. Line 52 also comprises the control line of a switch or modulator 54. Switch 54 receives on line 56, the output from an oscillator 58 set at ultrasonic frequency $f_2$ different from $f_1$.

In response to the pulse envelope on line 52, a pulse burst at frequency $f_2$ is passed through switch 54 to its output 48. This pulse burst signal is fed through diplexer 42 and is converted to an acoustic output signal in transducer 40. Thus, in response to acoustic burst at frequency $f_1$, portion 18 transmits a repeated acoustic burst but at a different frequency $f_2$. Portion 18 may be characterized as a repeater or as a transponder.

The repeated acoustic burst at frequency $f_2$ travels from the dog 24 to the trainer 16 where it is received in transducer 38 and fed through triplexer 34 on line 39.

Line 39 feeds a receiver 60 for producing a detected envelope signal on receiver output line 62 in response to the pulse burst at frequency $f_2$.

For converting the output of receiver 60 to a digital signal, line 62 feeds a comparator 64 which also receives an input from a D.C. reference source 66. When the signal on line 62 exceeds the signal from reference source 66 the output 68 of comparator 64 is digital zero. Reference 66 is chosen as an appropriate threshold level so that a digital zero pulse is presented on line 68 co-extensive with the pulse envelope of the received signal at frequency $f_2$.

Line 68 is the input to a flip-flop 70 which is clocked by the trailing edge of the pulse signal from pulse oscillator 26 via line 72. Thus the state on line 68 at the occurrence of the trailing edge of the pulse oscillator signal is continually set into flip-flop 70 and appears on flip-flop output line 74.

If the repeated pulse is received prior to the trailing edge of the pulses on line 72, a digital zero state appears on flip-flop output line 74. However, if the leading edge of the repeated pulse at frequency $f_2$ is not received at portion 10 prior to the occurrence of the aforementioned trailing edge, a digital one signal appears on line 74. It should be apparent that the latter occurs when the dog 24 is beyond approximately 20 feet from the trainer 16 in view of the 40 millisecond pulse width utilized.

Line 74 feeds the control input of a switch, modulator or gate element 76. Switch 76 also receives an input from an oscillator 78 at a frequency $f_3$ which is audible to the dog 24 but beyond the range of normal human hearing. The output of switch 76 is line 40. Thus, in response to a digital one signal or line 74, the output from oscillator 78 is passed through switch 76 and triplexer 34 and is sonically broadcasted via transducer 38. This broadcasted signal is in the nature of a dog whistle.

The dog 24 is summoned by the aforementioned dog whistle signal and homes in on the signal toward the trainer 16. Once the dog comes within approximately twenty feet of the trainer, the dog whistle signal is terminated in view of the continual clocking of flip-flop 70 to examine input 68.

It should now be appreciated that what has been described is an ultrasonic ranging system for activating a dog whistle signal automatically whenever a dog is beyond a predetermined distance such as twenty feet from a trainer or other location. It should also be apparent that the frequencies $f_1$ and $f_2$ are preferably beyond the range of hearing of the dog in order not to annoy the pet when it is within proper distance.

Having described the preferred embodiment of the present invention in great detail, it should be apparent that numerous modifications, additions and omissions in the details thereof are possible within the intended spirit and scope of the invention.

What is claimed is:

1. An animal training system responsive to the distance between an animal and a master location comprising: a first housing adapted to be positioned at said master location, transmitter means and receiver means in said first housing, and means in said first housing responsive to the time delay between transmitted and received signals for turning on means for signalling the animal to return to the master location and a second housing adapted to be worn on the animal, repeater means in said second housing for signalling said receiver means in response to receipt of a signal from said transmitter means.

2. The system of claim 1 wherein said transmitter means has an output signal at a superaudible sound frequency.

3. The system of claim 2 wherein said means for signalling the animal comprises a sound oscillator having a frequency inaudible to a normal human but audible to the animal.

* * * * *